(12) United States Patent
Tomita

(10) Patent No.: US 12,712,874 B2
(45) Date of Patent: Aug. 18, 2026

(54) INFORMATION PROCESSING APPARATUS AND CONNECTION DETERMINATION METHOD

(71) Applicant: SHARP KABUSHIKI KAISHA, Sakai City (JP)

(72) Inventor: Chikako Tomita, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 71 days.

(21) Appl. No.: 18/671,905

(22) Filed: May 22, 2024

(65) Prior Publication Data

US 2024/0406165 A1 Dec. 5, 2024

(30) Foreign Application Priority Data

May 30, 2023 (JP) ................................ 2023-088931

(51) Int. Cl.
*H04L 9/40* (2022.01)
*H04L 67/141* (2022.01)

(52) U.S. Cl.
CPC .......... *H04L 63/083* (2013.01); *H04L 67/141* (2013.01)

(58) Field of Classification Search
CPC . H04L 63/083; H04L 67/141; H04L 63/0807; H04L 63/108; H04N 1/00838; H04N 1/00854
See application file for complete search history.

(56) References Cited

U.S. PATENT DOCUMENTS

| | | | | |
|---|---|---|---|---|
| 7,321,435 B2 * | 1/2008 | Cherry | G06F 21/608 | 358/1.14 |
| 2014/0365380 A1 * | 12/2014 | Kolay | G06Q 10/20 | 705/305 |
| 2017/0346804 A1 * | 11/2017 | Beecham | H04L 9/3236 | |

FOREIGN PATENT DOCUMENTS

JP 2004-102420 A 4/2004

* cited by examiner

*Primary Examiner* — Sm A Rahman
(74) *Attorney, Agent, or Firm* — ScienBiziP, P.C.

(57) ABSTRACT

An information processing apparatus including: an inputter which receives an input of connection information; and one or more controllers which control connection to a service providing apparatus on the basis of the received connection information, in which the one or more controllers determine, when an authentication scheme in the service providing apparatus is an authentication scheme in which authorization is preliminarily required, whether or not connection based on the received connection information is practicable, according to an acquisition status of authentication information involved with the authorization.

8 Claims, 17 Drawing Sheets

30
10
NW

FIG. 2
10
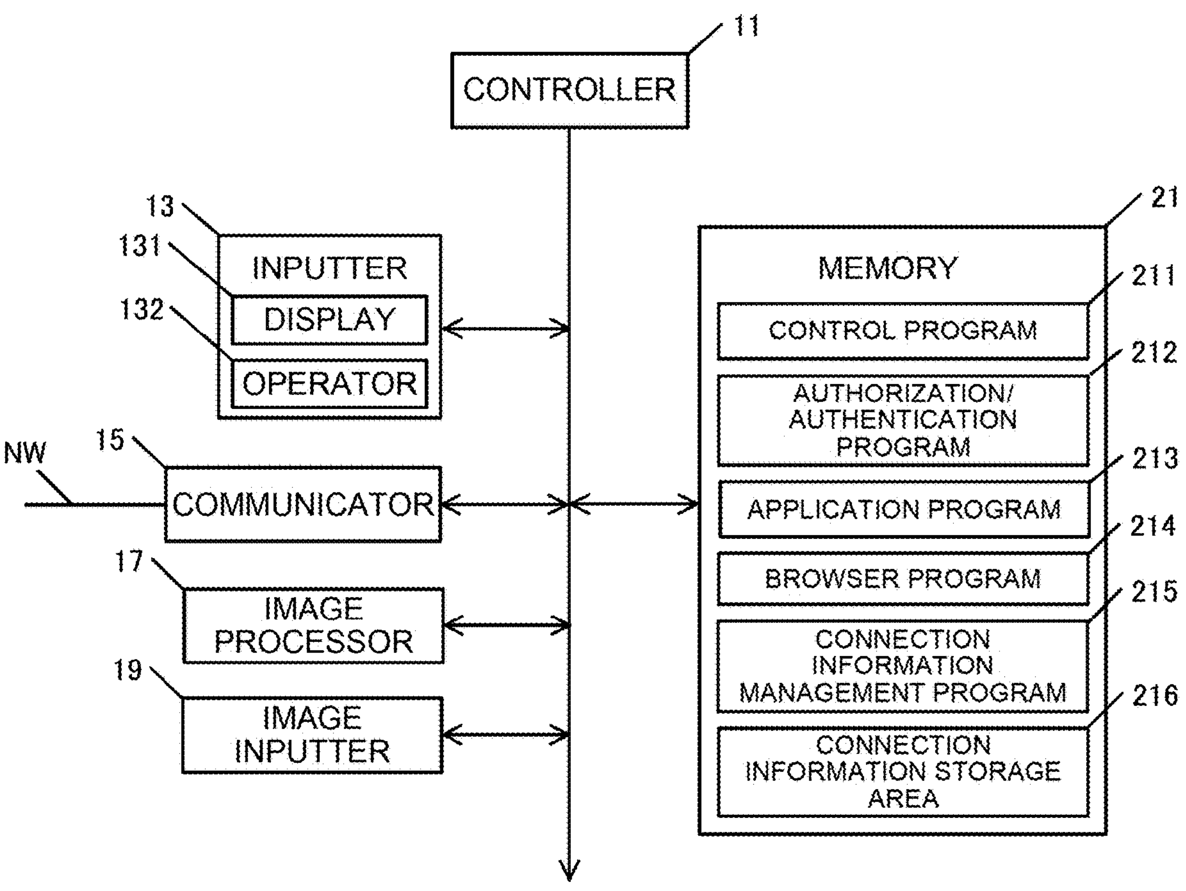
11
CONTROLLER
13
131
132
INPUTTER
DISPLAY
OPERATOR
NW
15
COMMUNICATOR
17
IMAGE PROCESSOR
19
IMAGE INPUTTER
21
MEMORY
211
CONTROL PROGRAM
212
AUTHORIZATION/ AUTHENTICATION PROGRAM
213
APPLICATION PROGRAM
214
BROWSER PROGRAM
215
CONNECTION INFORMATION MANAGEMENT PROGRAM
216
CONNECTION INFORMATION STORAGE AREA

| ID | USER NAME | PROVIDER | USE ACCOUNT | AUTHENTICATION SCHEME | AUTHORIZATION STATE | TOKEN ACQUISITION STATE | : |
|---|---|---|---|---|---|---|---|
| 01 | admin | aabbcc | admin@aabbcc.jp | OAuth | AUTHORIZED | ACQUIRED | : |
| 02 | user01 | ddeeff | user@ddeeff.jp | SMTP | — | — | : |
| : | : | : | : | : | : | : | : |

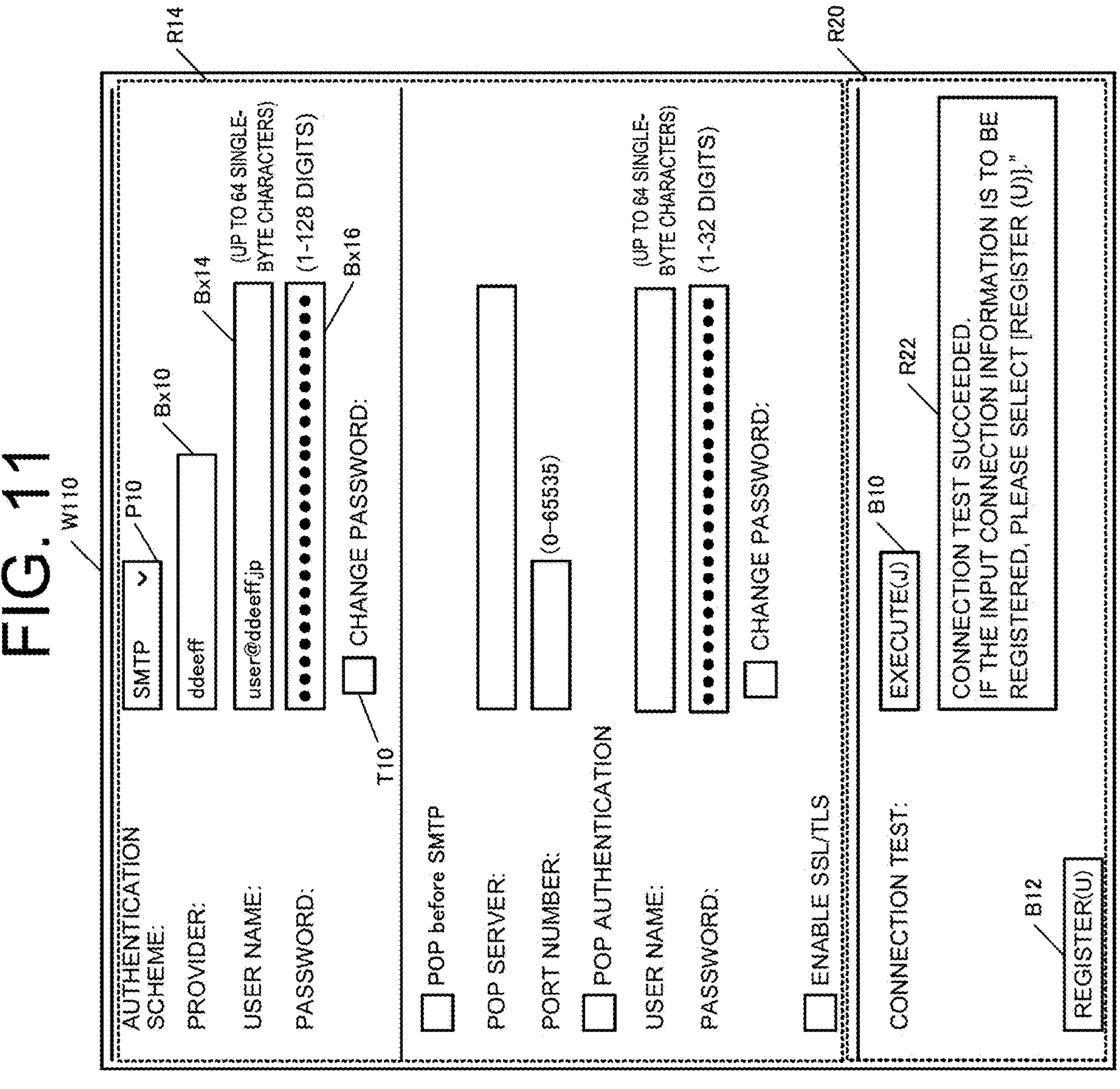
FIG. 11
W110
P10
R14
R20
Bx10
Bx14
Bx16
T10
AUTHENTICATION SCHEME:
SMTP
PROVIDER:
ddeeff
USER NAME:
user@ddeeff.jp
(UP TO 64 SINGLE-BYTE CHARACTERS)
PASSWORD:
(1-128 DIGITS)
CHANGE PASSWORD:
POP before SMTP
POP SERVER:
PORT NUMBER:
(0–65535)
POP AUTHENTICATION
USER NAME:
(UP TO 64 SINGLE-BYTE CHARACTERS)
PASSWORD:
(1-32 DIGITS)
CHANGE PASSWORD:
ENABLE SSL/TLS
CONNECTION TEST:
B10
EXECUTE(J)
R22
CONNECTION TEST SUCCEEDED.
IF THE INPUT CONNECTION INFORMATION IS TO BE REGISTERED, PLEASE SELECT [REGISTER (U)]."
B12
REGISTER(U)

FIG. 12

| | | STATE ON SCREEN AT SELECTION OF CONNECTION TEST BUTTON | | | | |
|---|---|---|---|---|---|---|
| REGISTRATION STATE | | SMTP: NO AUTHENTICATION/SMTP AUTHENTICATION POP3: PLAIN TEXT AUTHENTICATION/POP AUTHENTICATION | OAuth | | | |
| | | | UNACQUIRED | ACQUISITION PROCESSING IN PROGRESS | ACQUIRED | INVALID |
| NO AUTHENTICATION/SMTP AUTHENTICATION PLAIN TEXT AUTHENTICATION | | TEST EXECUTABLE (CONDUCT TEST WITH CONNECTION INFORMATION ON SCREEN) | ERROR (TOKEN UNACQUIRED) | | | |
| OAuth | UNACQUIRED | | | | | |
| | ACQUISITION PROCESSING IN PROGRESS | ERROR (PROMPT FOR SCREEN UPDATE) | ERROR (PROMPT FOR SCREEN UPDATE) | | | |
| | ACQUIRED | | TEST EXECUTABLE (*) | | | |
| | INVALID | | ERROR (TOKEN UPDATE FAILED) | | | |
| * ONLY WHEN PROVIDER AND ACCOUNT NAME ARE THE SAME AS REGISTERED VALUES, AND ERROR IS RETURNED (SCREEN UPDATE IS PROMPTED) IN OTHER CASES | | | | | | |

Figure 16:
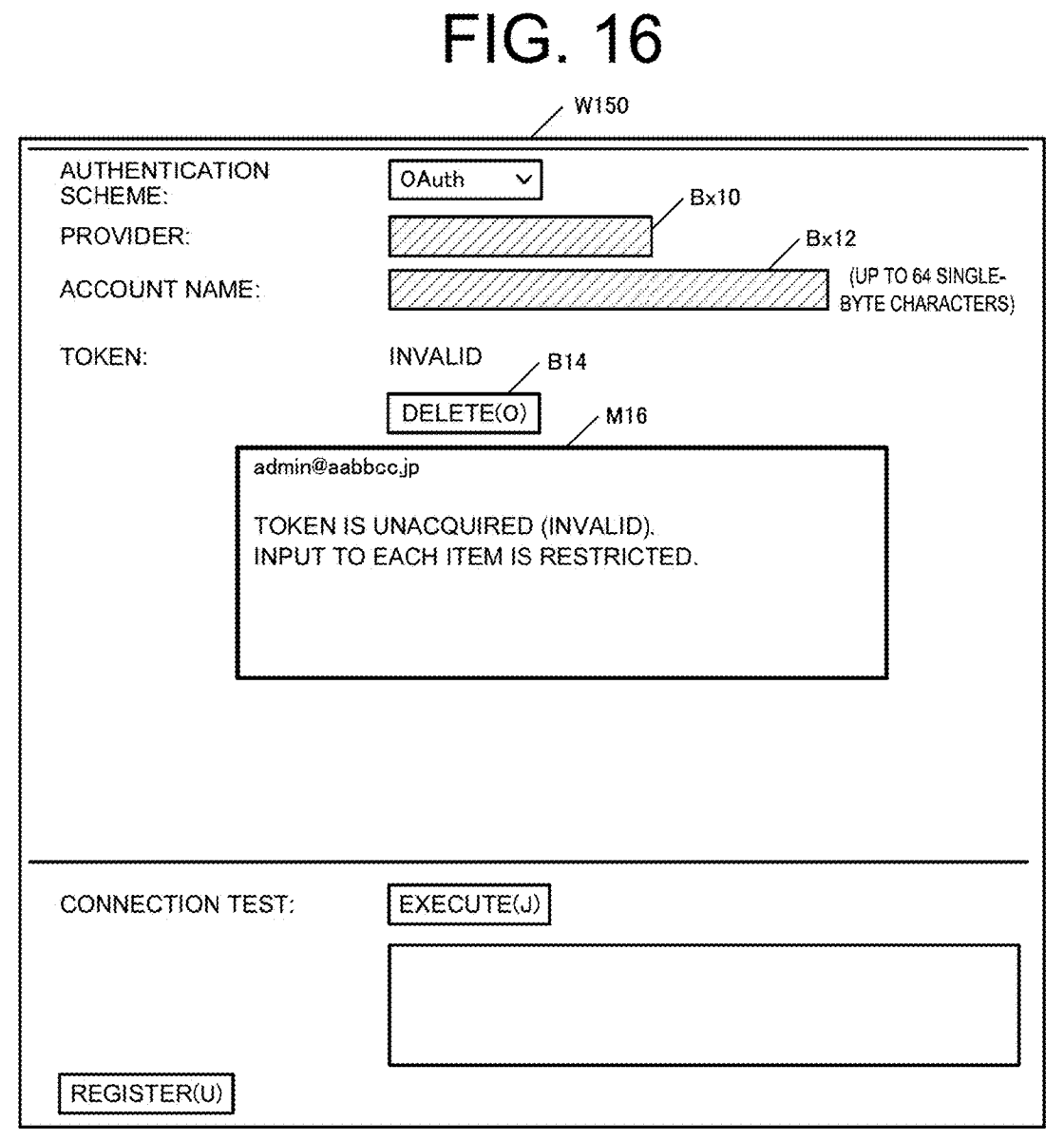

AUTHENTICATION SCHEME: OAuth

PROVIDER: Bx10

ACCOUNT NAME: Bx12 (UP TO 64 SINGLE-BYTE CHARACTERS)

TOKEN: INVALID

B14 DELETE(O)

M16 admin@aabbcc.jp

TOKEN IS UNACQUIRED (INVALID).
INPUT TO EACH ITEM IS RESTRICTED.

CONNECTION TEST: EXECUTE(J)

REGISTER(U)

Figure 17:
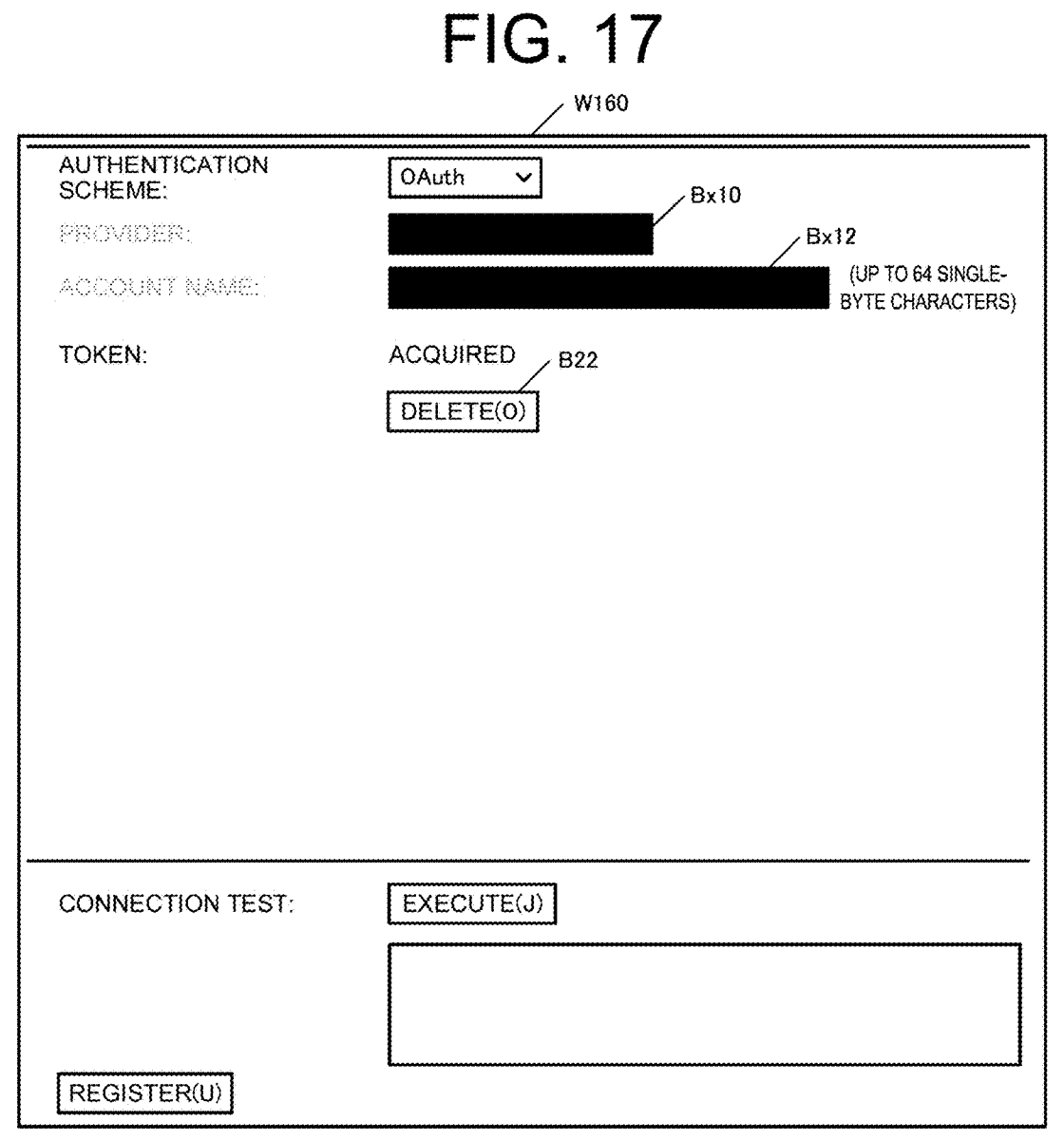

AUTHENTICATION SCHEME:
OAuth

PROVIDER:
Bx10

ACCOUNT NAME:
Bx12
(UP TO 64 SINGLE-BYTE CHARACTERS)

TOKEN:
ACQUIRED
DELETE(O)
B22

CONNECTION TEST:
EXECUTE(J)

REGISTER(U)

INFORMATION PROCESSING APPARATUS AND CONNECTION DETERMINATION METHOD

BACKGROUND OF THE INVENTION

Field of the Invention

The present disclosure relates to an information processing apparatus and the like.

Description of the Background Art

With respect to the setting of Simple Mail Transfer Protocol (SMTP)/Post Office Protocol (POP) authentication, there are known information processing apparatuses provided with a connection test function of verifying whether or not connection to a service provider is actually practicable by using connection information, such as provider information and an account, input by a user via a setting screen.

Incidentally, as an authentication method related to the SMTP/POP authentication, an OAuth authentication scheme, which is a more secure authentication scheme than a conventional authentication scheme in which a user ID and a password are used, is growing into the mainstream. In order to use the OAuth authentication, it is necessary to make an authorization request to a provider in advance and to be in an authorized state. Therefore, in the OAuth authentication, a connection test cannot be performed by merely inputting, via a connection test screen, connection information assumed by the user as in the case of the conventional SMTP/POP authentication.

An object of the present disclosure is to provide an information processing apparatus and the like capable of determining, even in an authentication scheme in which authorization is preliminarily required, whether or not connection to a service providing apparatus is practicable by using the connection information assumed by the user.

SUMMARY OF THE INVENTION

In order to solve the above problem, an information processing apparatus according to the present disclosure is provided with: an inputter which receives an input of connection information; and one or more controllers which control connection to a service providing apparatus on the basis of the connection information that has been received, and is characterized in that the one or more controllers determine, when an authentication scheme in the service providing apparatus is an authentication scheme in which authorization is preliminarily required, whether or not connection based on the connection information that has been received is practicable, according to an acquisition status of authentication information involved with the authorization.

Also, a connection determination method according to the present disclosure pertains to a connection determination method including: receiving an input of connection information; and determining whether or not connection to a service providing apparatus is practicable on the basis of the connection information that has been received, and the connection determination method is characterized by determining, when an authentication scheme in the service providing apparatus is an authentication scheme in which authorization is preliminarily required, whether or not connection based on the connection information that has been received is practicable, according to an acquisition status of authentication information involved with the authorization.

According to the present disclosure, it is possible to provide an information processing apparatus and the like capable of determining, even in an authentication scheme in which authorization is preliminarily required, whether or not connection to a service providing apparatus is practicable by using the connection information assumed by the user.

BRIEF DESCRIPTION OF THE DRAWINGS

FIG. 2 is a functional configuration diagram of the multifunction peripheral.

FIG. 3 is a diagram illustrating a connection information management table.

FIG. 11 is a diagram illustrating an operation example according to the first embodiment.

FIG. 12 is a diagram illustrating an operation example according to the first embodiment.

FIG. 16 is a diagram illustrating an operation example according to the second embodiment.

FIG. 17 is a diagram illustrating a modification example.

DESCRIPTION OF THE PREFERRED EMBODIMENTS

Embodiments of the present disclosure will be described below with reference to the accompanying drawings. Note that the embodiments described below are presented as examples for illustrating the present disclosure, and the technical content of the embodiments as recited in the appended claims is not limited by the following description.

A function (a connection test) of testing, in the setting of SMTP/POP authentication, whether or not connection to a service provider is actually practicable by using connection information that has been input to a test screen by the user is known. The user can register the connection information that has been input to the test screen after confirming that a result of the connection test is successful. In light of this objective, it is assumed that a connection test is conducted by using the connection information (setting values assumed by the user) displayed on the test screen at the time of performing the connection test.

Meanwhile, in OAuth authentication, it is necessary to make an authorization request to a service provider in advance and to be in an authorized state. Therefore, in the OAuth authentication, a connection test cannot be performed by merely inputting, via a connection test screen, connection information assumed by the user as in the case of the conventional SMTP/POP authentication. Here, if authorization has already been obtained in the OAuth authentication preliminarily, it is possible to confirm whether or not a token is acquired and a service to be provided by a service provider can be used. At this time, for example, even if connection information input via a test screen is different from the connection information used at the time when the authorization was obtained, the connection test itself may succeed depending on the timing of the connection test. In such a case, when the user registers the connection information input via the test screen, a discrepancy occurs between the connection information by which the connection test has been successful and the connection information registered after the connection test (the connection information input via the test screen). Therefore, when a communication connection with the service provider fails, the user may be confused.

In the present disclosure, embodiments described below realize an information processing apparatus and the like capable of determining, even in an authentication scheme in which authorization is preliminarily required such as the OAuth authentication, whether or not connection to a service providing apparatus is practicable by using the connection information assumed by the user.

1 First Embodiment

1.1. Overall Configuration

Figure 1:
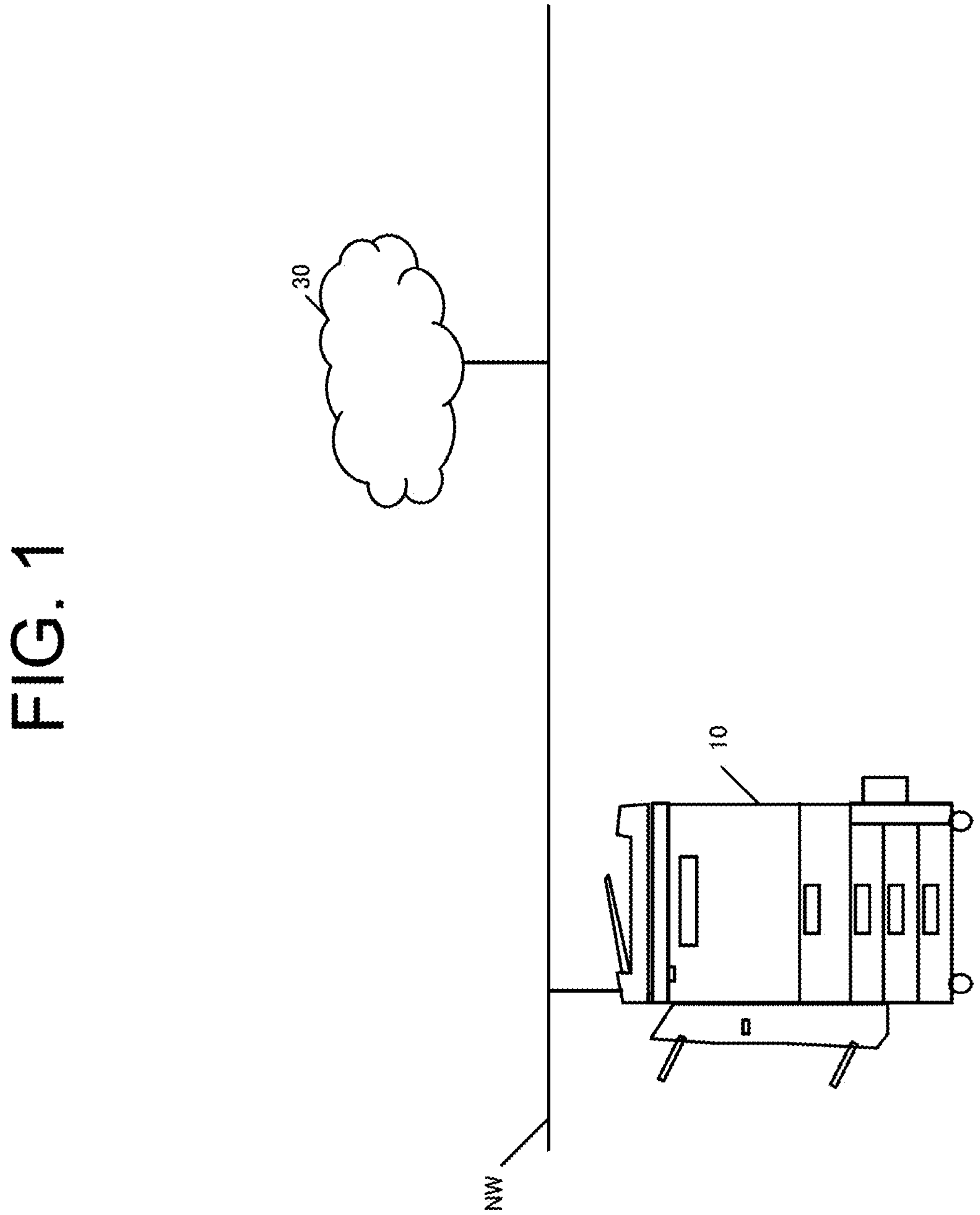
FIG. 1 is a diagram illustrating a form of connection between a multifunction peripheral and a cloud.

FIG. 1 is a diagram illustrating an example of a form of connection between a multifunction peripheral 10, which serves as an information processing apparatus according to a first embodiment, and a cloud 30 as a service providing apparatus.

The multifunction peripheral 10 according to the first embodiment is an information processing apparatus capable of implementing printing, copying, faxing (Internet Faxing), e-mailing, and the like, in a single housing. In the first embodiment, the multifunction peripheral 10 will be described as one form of the information processing apparatus. However, the information processing apparatus is not particularly limited as long as the information processing apparatus can execute authentication processing by the use of an account corresponding to OAuth authentication. That is, the information processing apparatus may alternatively be, for example, a copier, a printer, or a facsimile machine.

The multifunction peripheral 10 is connected to the cloud 30 via a network NW. The multifunction peripheral 10 is configured such that communication with the cloud 30 can be performed on the basis of a communication protocol such as the Internet Protocol (IP), Transmission Control Protocol (TCP), Hypertext Transfer Protocol (HTTP), and SMTP. The network NW represents a network line such as a local area network (LAN), a wide area network (WAN), or the Internet. The number of multifunction peripherals 10 connected to the network NW is not limited to that illustrated in FIG. 1. That is, a plurality of multifunction peripherals 10 may be connected to the network NW.

The cloud 30 is, for example, a service providing apparatus including an authorization server (not illustrated), which performs use authorization related to e-mail distribution by executing an authorization code flow based on the OAuth 2.0 authentication scheme. There is no limitation on a device configuration of the cloud 30 as long as the cloud 30 is configured to generate an access token, a refresh token, and the like, as an authorization code and authentication information according to the authorization processing and authentication processing. For example, an authorization server, which processes an authorization code flow, and an e-mail distribution server may be configured as separate bodies, or the cloud 30 may be configured as a single body device having both the authorization function/authentication function and the e-mail distribution function. The cloud 30 can function as a service provider which performs e-mail distribution in conformity with the SMTP protocol and the POP protocol.

1.2 Functional Configuration

1.2.1 Regarding Multifunction Peripheral 10

Next, a functional configuration of the multifunction peripheral 10 according to the first embodiment will be described with reference to FIG. 2. The multifunction peripheral 10 is provided with a controller 11, an inputter 13, a communicator 15, an image processor 17, an image inputter 19, and a memory 21.

The controller 11 controls the multifunction peripheral 10 as a whole. The controller 11 is configured by, for example, one or more arithmetic devices (such as central processing units [CPUs]). The controller 11 reads and executes various programs stored in the memory 21, thereby implementing functions thereof.

The inputter 13 is an inputter which receives input of various kinds of information by a user or the like, including input of connection information by the user via a test screen which will be described later. The inputter 13 may include a display 131 and an operator 132.

The display 131 is a display device which displays various kinds of information to the user or the like. The display 131 can be configured by, for example, a liquid crystal display (LCD), an organic electro-luminescence (EL) display, or the like. The display 131 displays, on the basis of control by the controller 11, a screen based on screen information for browsing generated by a browser program 214, which will be described later.

The operator 132 receives input of information by the user or the like. The operator 132 can be configured by, for example, various input devices such as operation keys, e.g., hard keys and software keys, and buttons.

Note that the inputter 13 can be configured as a touch panel having both the functions of the display 131 and the operator 132. In this case, the touch panel can function as a user interface (UI) via a web browser screen or an application screen to be displayed. As an input method for the touch panel, for example, a common method such as a resistive method, an infrared method, an electromagnetic induction method, or a capacitive sensing method may be adopted.

The communicator 15 is provided with one of or both of a wired interface and a wireless interface for communicating with another device (the cloud 30) via the network (NW) such as a LAN, a WAN, the Internet, a telephone line, or a fax line, for example. Further, the communicator 15 may be provided with, for example, an interface related to (short-range) wireless communication technology such as Bluetooth (registered trademark), Near-field communication (NFC), Wi-Fi (registered trademark), ZigBee (registered trademark), Irda, wireless USB, and the like.

The image processor 17 includes an image former which forms an image, which is based on image data, on a sheet of paper as a recording medium. The image former feeds paper from a paper feed tray (not illustrated), forms an image based on the image data on the paper, and then discharges the paper to a paper discharger (not illustrated). The image former can be configured by a laser printer or the like that uses an electrophotographic method, for example. In this case, the image former forms an image by using toners supplied from toner cartridges, which are not illustrated, corresponding to respective toner colors (e.g., cyan, magenta, yellow, and black). Further, the image processor 17 may include a form in which shading compensation, density correction, and the like, are performed on the image data that has been input from the image inputter 19, thereby generating output image data to be attached to an e-mail.

The image inputter 19 generates image data by scanning a document. The image inputter 19 is provided with, for example, an image sensor such as a charge-coupled device (CCD) or a contact image sensor (CIS), and can be configured as a scanner device having an automatic document feeder (ADF), a flatbed for placing a document thereon and reading the document, and the like. A configuration of the image inputter 19 is not particularly limited as long as the image inputter 19 is configured such that image data can be generated by reading a reflected light image from a document image with the image sensor. The image inputter 19 can also be configured as an interface which can acquire, for example, image data stored in a portable storage medium such as a Universal Serial Bus (USB) memory, or image data transmitted from an external terminal device (not illustrated).

The memory 21 stores therein various kinds of data and various programs necessary for the operation of the multifunction peripheral 10. The memory 21 can be configured by storage devices such as a random-access memory (RAM), a hard disk drive (HDD), a solid state drive (SSD), and a read-only memory (ROM).

In the first embodiment, the memory 21 stores a control program 211, an authorization/authentication program 212, an application program 213, the browser program 214, and a connection information management program 215, and reserves a connection information storage area 216.

The control program 211 is a program that the controller 11 reads in comprehensively controlling the multifunction peripheral 10. The controller 11 that has read the control program 211 functions as an OS, and as the controller 11 controls driving of the inputter 13 (the display 131 and the operator 132), the communicator 15, the image processor 17, the image inputter 19, and the like, each job such as printing, copying, faxing, and e-mailing is set, executed, or post-processed, for example.

The authorization/authentication program 212 is a program that the controller 11 reads in performing authorization processing and authentication processing with the cloud 30. The controller 11 that has read the authorization/authentication program 212 performs the authorization processing and authentication processing in relation to the cloud 30 via a web browser. The controller 11 that has read the authorization/authentication program 212 can perform not only the authentication of an authentication scheme in which preliminary authorization is required, such as the OAuth authentication, but can also perform, for example, conventional authentication processing (e.g., SMTP authentication processing and POP authentication processing) in which authentication is carried out on the basis of a combination of a user name (user ID) and a password, or login authentication in relation to the multifunction peripheral 10.

The application program 213 is an application that can implement a function such as printing, copying, faxing, and e-mailing by being read by the controller 11. The application program 213 may be an integrated management application which takes care of the setting, management, and the like, of the multifunction peripheral 10, or may be an individual application (for example, a scan transmission application or the like) in which the integrated management application is used as a platform. The controller 11 that has read the application program 213 can use the function exerted by the other programs such as the authorization/authentication program 212 via an application programming interface (API). As the application program 213 and the authorization/authentication program 212 cooperate with each other, an authorization code and a token can be acquired from, updated in, or handed over to the cloud 30. While it has been described above that the application program 213 and the authorization/authentication program 212 are separate structures, the function of the authorization/authentication program 212 can also be provided in the application program 213.

The browser program 214 is a program that the controller 11 reads in generating screen information for browsing by rendering content received as input. The controller 11 that has read the browser program 214 functions as a web browser, and can receive an input from the user via the web browser screen being displayed and display a notification from an application to the user.

The connection information management program 215 is a program that the controller 11 reads in managing provider information and an account set according to the cloud 30 as connection information. Further, the controller 11 that has read the connection information management program 215 determines, via a test screen related to a connection test which will be described later, whether or not the connection test can be executed on the basis of the connection information input or selected by the user. In the present disclosure, an act of testing whether or not connection (communication) with the cloud 30 serving as a service provider can be established will be referred to as a connection test. Further, when it is determined by the controller 11 that the connection test can be executed, the controller 11 performs the connection test using the connection information input or selected via the test screen. If the connection test has been successful, the controller 11 receives an instruction to register the connection information and stores the relevant connection information in the connection information storage area 216.

The connection information storage area 216 is a storage area for storing connection information for the cloud 30. The connection information storage area 216 stores the connection information for which a registration instruction has been received, on the basis of control by the controller 11 that has read the connection information management program 215. The connection information storage area 216 can also be provided in an external storage device or the like (not illustrated) connected to the network NW other than the multifunction peripheral 10.

Incidentally, the connection information by which the connection test has been successful can also be managed as a connection information management table 2161 exemplified in FIG. 3. Here, a data configuration of the connection information management table 2161 will be described with reference to FIG. 3. Note that an example of the data configuration of the connection information management table 2161 exemplified in FIG. 3 is merely an example, and management of the connection information is not limited to the example illustrated in FIG. 3. For example, the connection information management table 2161 may include items other than the management items exemplified in FIG. 3, and the form of management is not limited to a table form and may be a database.

The connection information management table 2161 exemplified in FIG. 3 includes ID, a user name, a provider, a use account, an authentication scheme, an authorization state, and a token acquisition state.

The "ID" is an identifier for uniquely identifying connection information to be managed. The "user name" represents the name of an owner of an account related to the connection information. The "provider" indicates provider information representing the name of a service provider, which is an authorization/authentication destination. The "use account" represents an account used for authorization processing and authentication processing. The "authentication scheme" represents an authentication scheme corresponding to the account. The "authorization state" represents an authorization state in a case where the authentication scheme is "OAuth" authentication. The "token acquisition state" represents an acquisition state of a token as authentication information. In addition to these management items, the connection information management table 2161 may include, for example, a password associated with the use account, a token (itself), an authorization code, and a contact address (for example, an e-mail address) of the account owner, in the management items.

For example, connection information related to ID "01" represents an account whose owner is the user having the user name "admin". The account related to ID "01" indicates that the service provider "aabbcc" (corresponding to the cloud 30) is the authorization/authentication destination, and the use account used for connection at this time is "admin@aabbcc.jp". Further, the connection information related to ID "01" indicates that the authentication scheme is the "OAuth" authentication scheme, the authorization state is "authorized", and a token is "acquired".

In addition, connection information related to ID "02" represents an account whose owner is the user having the user name "user 01". The account related to ID "02" indicates that the service provider "ddeeff" is the authentication destination, and the use account used for connection at this time is "user@ddeeff.jp". Further, the connection information related to ID "02" indicates that the authentication scheme is the "SMTP" authentication scheme.

As exemplified in FIG. 3, the connection information by which the connection test has been successful can also be managed in a unified manner in accordance with various parameters such as the connection information, authentication scheme, login user (the presence or absence of the administrator rights), and execution timing of the connection test.

1.2.2 Regarding Cloud 30

The cloud 30 according to the first embodiment can use a known configuration as long as the configuration of the cloud 30 includes an authorization server which performs use authorization of e-mail distribution by executing an authorization code flow based on the OAuth authentication scheme. Therefore, a description regarding a functional configuration of the cloud 30 will be omitted.

1.3 Flow of Processing

Figure 4:
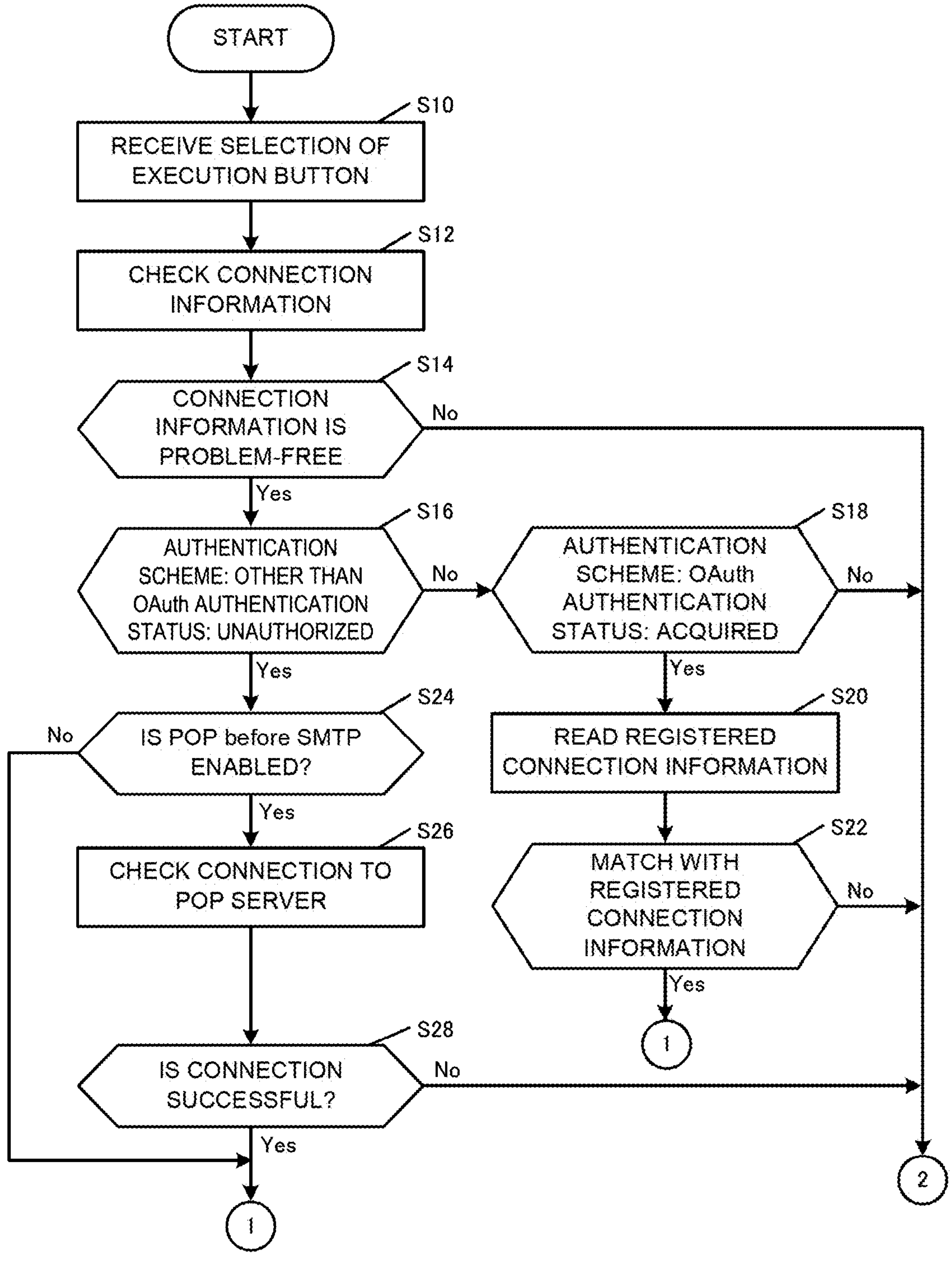
FIG. 4 is a flowchart illustrating a flow of processing according to a first embodiment.
Figure 5:
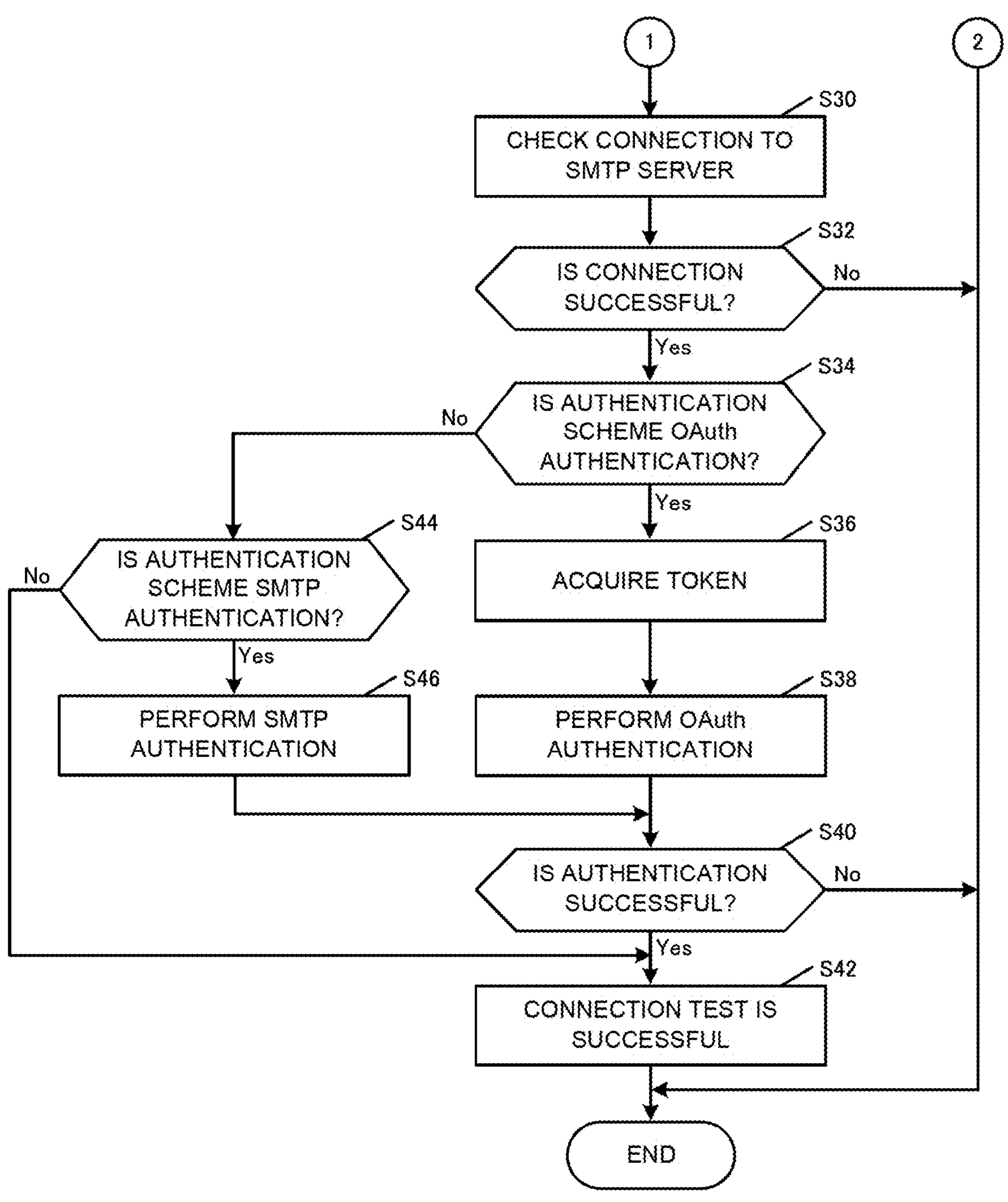
FIG. 5 is a flowchart illustrating a flow of processing according to the first embodiment.

Next, a flow of processing according to the first embodiment will be described with reference to the flowcharts of FIGS. 4 and 5. Processing described with reference to FIGS. 4 and 5 is the processing executed by the controller 11 as the controller 11 reads the control program 211, the authorization/authentication program 212, the application program 213, the browser program 214, the connection information management program 215, and the like. Also, in FIGS. 4 and 5, a description will be given on the assumption that the connection information assumed by the user is input to the test screen which will be described later. Furthermore, in FIGS. 4 and 5, while SMTP authentication is exemplified as the authentication scheme other than the OAuth authentication, a flow of the processing is basically the same for the case of POP authentication.

First, the controller 11 receives selection of an execution button which receives an instruction to execute a connection test (step S10).

The controller 11 checks the connection information input to the test screen (step S12). Then, the controller 11 determines whether or not the input connection information is problem-free (step S14). If the input connection information is problem-free, in other words, regardless of success or failure of the connection test, if a port number or the like used for communication is input in addition to the connection information, for example, and there is no obstacle in the execution of the connection test, the controller 11 determines that the connection information is problem-free. If it is determined that the connection information is problem-free, the controller 11 determines whether a registration state of the authentication scheme indicates a scheme other than the OAuth authentication, or a status related to the OAuth authentication indicates "unauthorized" (step S14; Yes→step S16).

Here, when the authentication scheme is referred to as being other than the OAuth authentication, the scheme is intended as an authentication scheme that is different from the OAuth authentication, such as the SMTP authentication, POP authentication, plain text authentication, or no authentication. That is, the authentication scheme other than the OAuth authentication is not particularly limited as long as it is an authentication scheme in which authorization is not preliminarily required. Further, when a status related to the OAuth authentication is referred to as "unauthorized", the status is intended as a situation in which an authorization flow by the OAuth authentication scheme has never been executed before input of the connection information via the test screen, and thus, the setting to use the OAuth authentication is not made, or a situation in which although the authorization flow by the OAuth authentication has been executed in the past, an authorization status indicates "unauthorized" due to the authorization having failed, or the setting for using the OAuth authentication having been deleted, for example. Note that the registration state of the authentication scheme may be the registration state of the authentication scheme applied as an apparatus setting of the multifunction peripheral 10, or may be the registration state of the authentication scheme based on the connection information stored in the connection information storage area 216.

If it is determined that the authentication scheme is not a scheme other than the OAuth authentication and the status related to the OAuth authentication does not indicate "unauthorized", the controller 11 determines whether or not the authentication scheme is the OAuth authentication scheme, and authentication information involved with the authorization by the OAuth authentication has already been acquired (step S16; No→step S18).

If it is determined that the authentication scheme is the OAuth authentication scheme, and authentication information involved with the authorization by the OAuth authentication has already been acquired, the controller 11 reads the registered connection information (provider information and an account) from the connection information storage area 216 (step S18; Yes→step S20).

Next, the controller 11 determines whether or not the registered connection information matches the connection information input to the test screen. If it is determined that the registered connection information matches the connection information input to the test screen, the controller 11 checks connection to an SMTP server (step S22; Yes→step S30). If it is determined that the connection to the SMTP server has been successful, the controller 11 determines whether or not the authentication scheme is the OAuth authentication (step S32; Yes→step S34).

If it is determined that the authentication scheme is the OAuth authentication, the controller 11 acquires a token (step S34; Yes→step S36). When a token is acquired, the controller 11 performs the OAuth authentication (step S38). Then, the controller 11 determines whether or not the OAuth authentication has been successful (step S40). In a case where time has not elapsed from the acquisition of the token based on the registered connection information and the same token can be used (i.e., within a validity period), the processing related to step S36 may be omitted. In this case, it is also possible to adopt a configuration which measures the time elapsed from the acquisition of a token based on the registered connection information, and acquires a token when a predetermined elapsed time has passed.

If it is determined that the authentication by the OAuth authentication scheme has been successful, the controller 11 determines that the connection test has been successful and ends the processing (step S40; Yes→step S42).

In step S16, if it is determined that the authentication scheme is other than the OAuth authentication, or the status related to the OAuth authentication indicates "unauthorized", the controller 11 determines whether or not POP before SMTP is enabled (step S16; Yes→step S24).

If it is determined that the POP before SMTP is enabled, the controller 11 checks connection to a POP server by using the connection information that has been input to the test screen (step S24; Yes→step S26). If it is determined that the connection to the POP server has been successful, the controller 11 checks connection to the SMTP server (step S28; Yes→step S30). Meanwhile, if it is determined that the POP before SMTP is not enabled, the controller 11 omits the processing of step S26 and step S28 and checks connection to the SMTP server (step S24; No→Step S30). Since the processing of step S30 and the subsequent steps is the same as the processing described above, description thereof is omitted.

Incidentally, in step S34, if it is determined that the authentication scheme is not the OAuth authentication, the controller 11 determines whether or not the authentication scheme is the SMTP authentication (step S34; No→step S44). If it is determined that the authentication scheme is the SMTP authentication, the controller 11 performs the SMTP authentication (step S44; Yes→step S46). Then, the controller 11 determines whether or not the SMTP authentication has been successful (step S40).

If it is determined that the authentication by the SMTP authentication scheme has been successful, the controller 11 determines that the connection test has been successful and ends the processing (step S40; Yes→step S42).

Meanwhile, if it is determined that the authentication scheme is not the SMTP authentication scheme, the controller 11 determines that the connection test has been successful without performing authentication, and ends the processing (step S44; No→step S42).

The controller 11 ends the processing by assuming that the connection test has failed in a case where there is a problem in the connection information input to the test screen (step S14; No), a case where it is determined that the authentication scheme is the OAuth authentication scheme and the authentication information involved with the authorization by the OAuth authentication has not been acquired yet (step S18; No), a case where it is determined that the registered connection information does not match the connection information input to the test screen (step S22; No), a case where it is determined that the connection to the POP server has failed (step S28; No), a case where it is determined that the connection to the SMTP server has failed (step S32; No), or a case where it is determined that the authentication by the OAuth authentication scheme has failed (step S40; No).

1.4 Operation Examples

Figure 6:
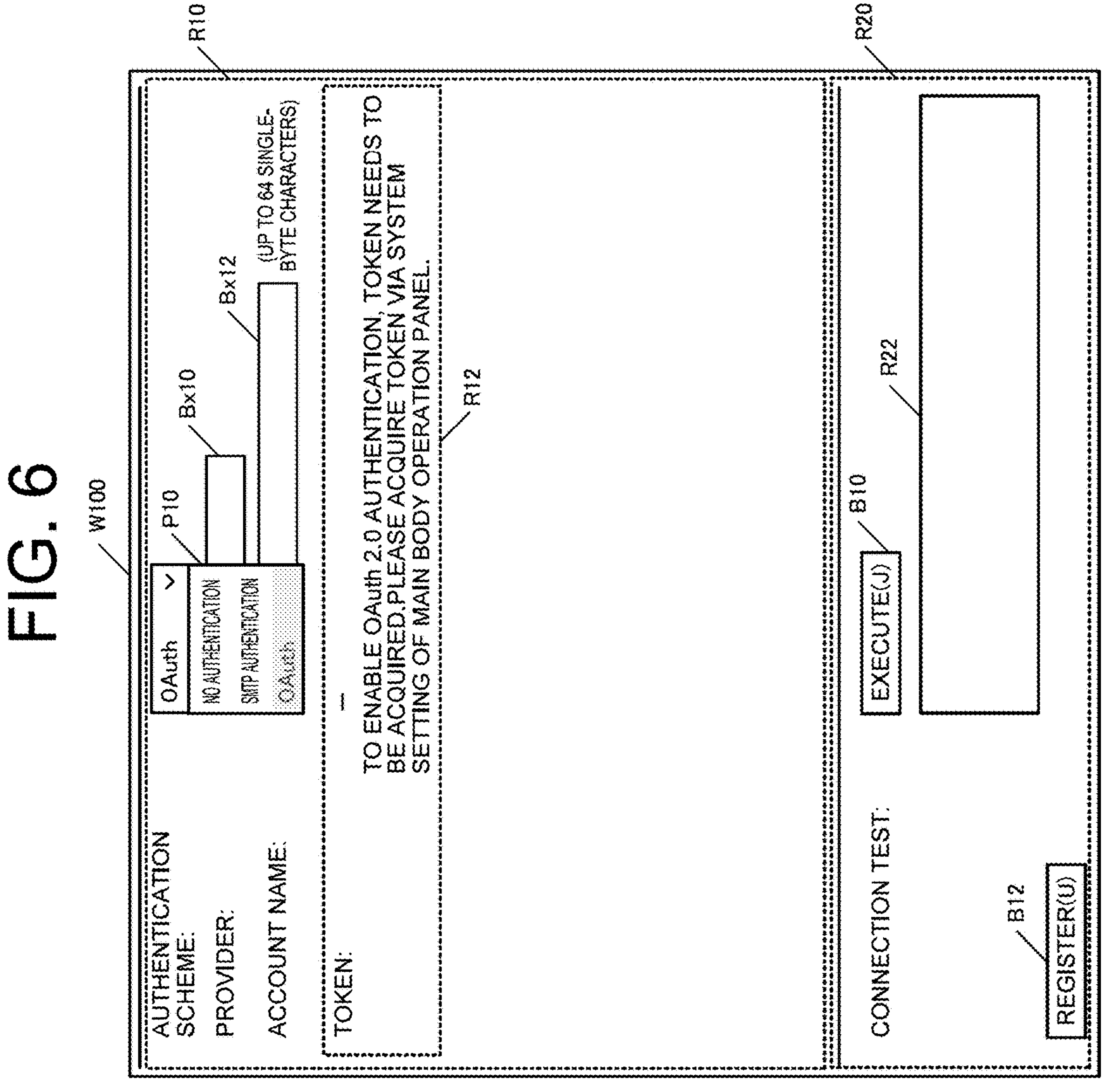
FIG. 6 is a diagram illustrating an operation example according to the first embodiment.

Next, operation examples according to the first embodiment will be described. FIG. 6 is a diagram illustrating an example of a display configuration of a test screen W100. The test screen W100 exemplified in FIG. 6 is an example of a display configuration of the test screen W100 to be displayed by the controller 11 when the OAuth authentication is selected as the authentication scheme via an authentication scheme selection pull-down menu P10.

The test screen W100 includes a connection information input area R10 and a connection test execution area R20. The connection information input area R10 is an area which receives input of the connection information. The connection information input area R10 can display different items according to the authentication scheme selected via the authentication scheme selection pull-down menu P10. The test screen W100 exemplified in FIG. 6 displays, in accordance with the selection of the OAuth authentication, a provider input box Bx10 and an account name input box Bx12 as the input items of the connection information, and a token acquisition status display area R12 as the display item.

The provider input box Bx10 is an input box to receive an input of the provider information for specifying the service provider, which is regarded as the target of the authorization processing and authentication processing. In the provider input box Bx10, information for specifying the cloud 30 on the network NW, such as the name, a domain name, and a uniform resource locator (URL) of the cloud 30 as the service provider, for example, can be input.

The account name input box Bx12 is an input box to receive an input of an account for the service provider that has been input in the provider input box Bx10.

The token acquisition status display area R12 is an area which displays an acquisition status of a token issued from the service provider in accordance with the authorization by the OAuth authentication. In the token acquisition status display area R12, the status such as "unacquired", "acquired", "acquisition processing in progress", "invalid", "-(unconfirmed)", and the like, can be displayed according to the acquisition status of the token. Note that a condition for executing the OAuth authentication may be displayed in the token acquisition status display area R12 as illustrated in FIG. 6. As the user confirms the display contents (a message "To enable OAuth 2.0 authentication, token needs to be acquired. Please acquire token via system setting of main body operation panel.") displayed as the condition for executing the OAuth authentication, the condition for executing the OAuth authentication can easily be ascertained.

The connection test execution area R20 includes an execution button B10 which receives an instruction to execute a connection test, an execution result or the like display area R22, and a registration button B12. The execution button B10 is a button which receives an instruction to execute the connection test. When the controller 11 receives selection of the execution button B10 by the user, the controller 11 executes the connection test. The execution result or the like display area R22 is an area for displaying a result of execution of the connection test and information to be notified to the user. The registration button B12 is a button which receives an instruction to register the connection information that has been input via the connection information input area R10 when the connection test has been successful. Alternatively, the registration button B12 may be displayed at a timing when the executed connection test succeeded. When the controller 11 receives selection of the registration button B12, the controller 11 stores the connection information, which has been input via the connection information input area R10, in the connection information storage area 216 as first connection information by which connection has been successful.

Figure 7:
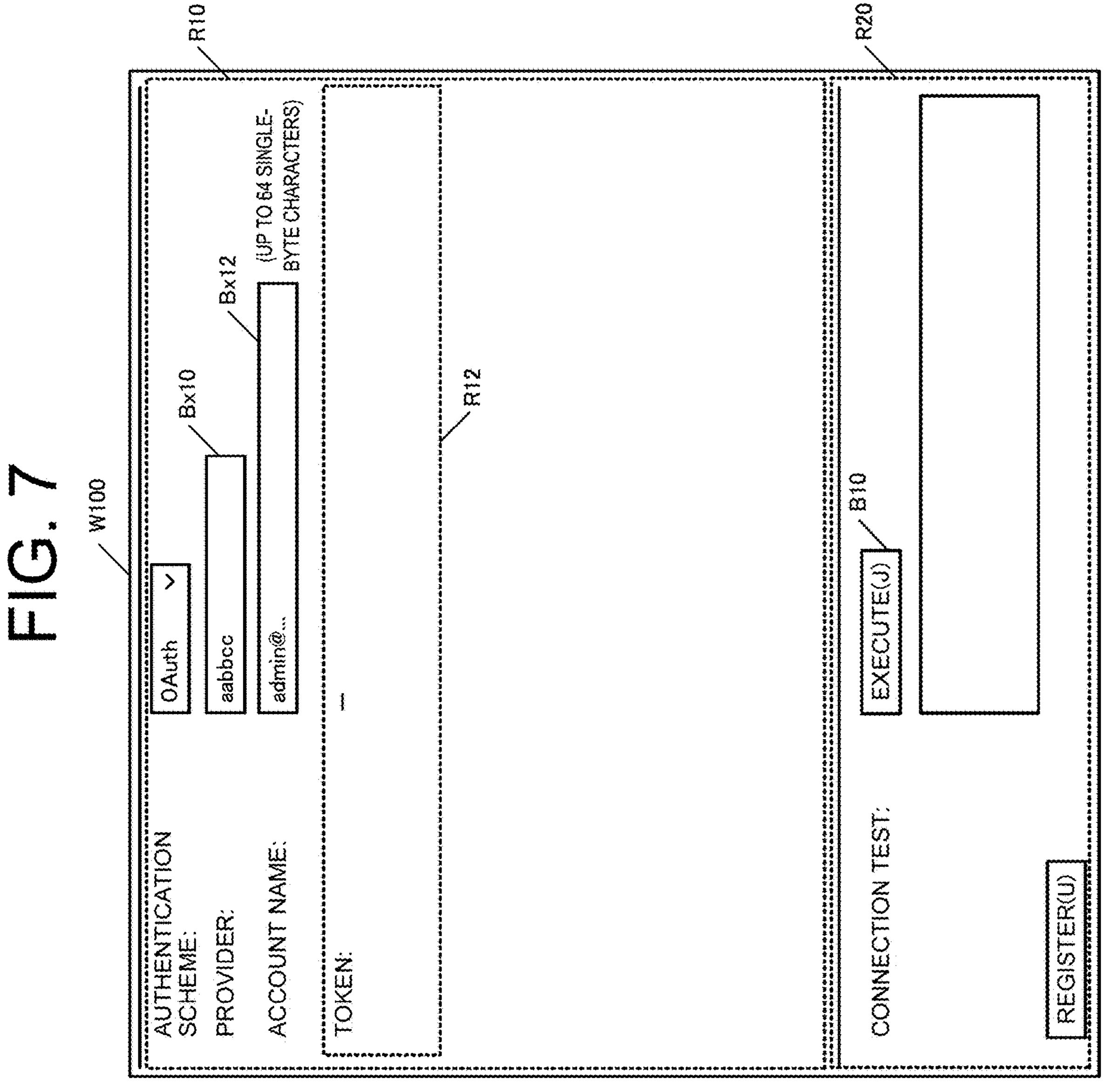
FIG. 7 is a diagram illustrating an operation example according to the first embodiment.

FIG. 7 is a diagram illustrating a state in which the user inputs the connection information via the connection information input area R10 of the test screen W100. FIG. 7 shows the state in which the OAuth authentication is selected as the authentication scheme via the authentication scheme selection pull-down menu P10, and after input of the name "aabbcc" of the cloud 30 as the service provider, which is set to the target of the authorization processing and authentication processing, in the provider input box Bx10, "admin@aabbcc.jp" as the account to be used for the connection is in the middle of input (admin@ . . . ).

Figure 8:
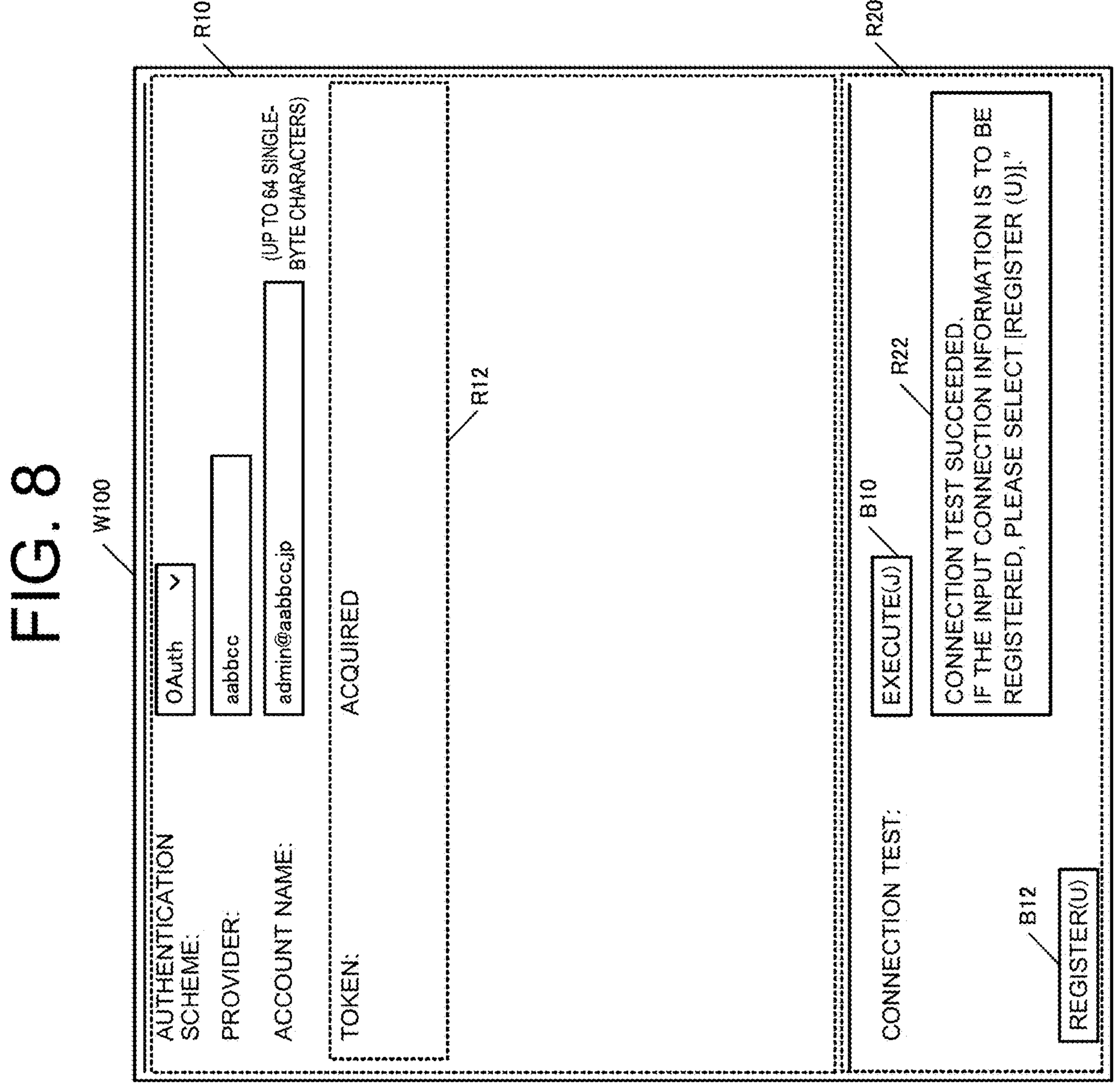
FIG. 8 is a diagram illustrating an operation example according to the first embodiment.

FIG. 8 is a diagram illustrating an example of a display configuration of the test screen W100 when a connection test has been successful. The operation example illustrated in FIG. 8 is an operation example corresponding to the processing related to step S42 of FIG. 5.

FIG. 8 shows an example which displays, in the execution result or the like display area R22, that a connection test, which has been executed in response to receiving an instruction to select the execution button B10, succeeded (i.e., a message "Connection test succeeded. If the input connection information is to be registered, please select [Register (U) button]."). At this time, "acquired" indicating that a token has already been acquired is displayed in the token acquisition status display area R12. When the controller 11 receives selection of the registration button B12 by the user, the controller 11 stores the connection information, which has been input via the connection information input area R10, in the connection information storage area 216 as the first connection information by which the connection has been successful.

Figure 9:
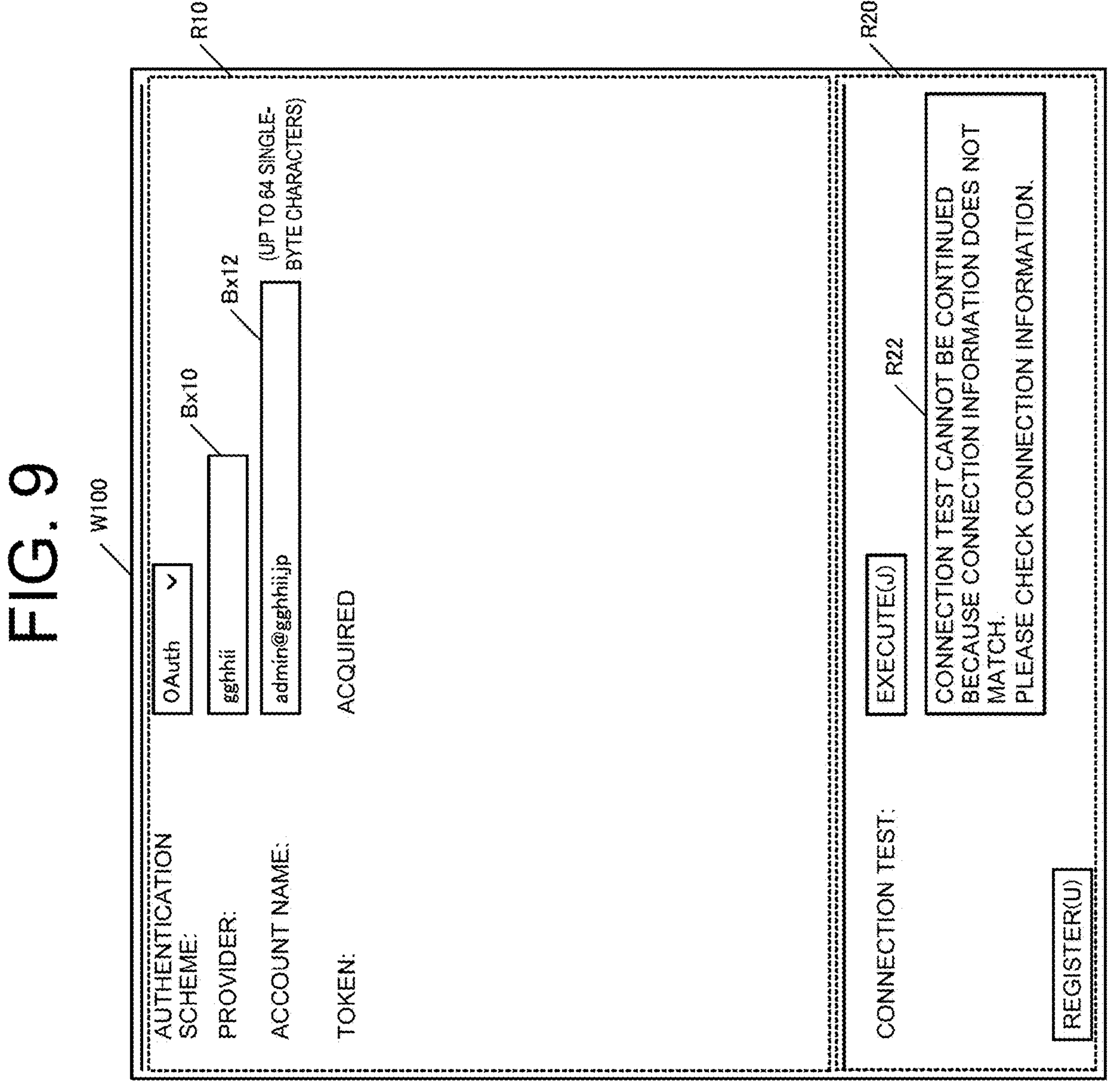
FIG. 9 is a diagram illustrating an operation example according to the first embodiment.

FIG. 9 is a diagram illustrating an example of a display configuration of the test screen W100 when a connection test has failed. The operation example described with reference to FIG. 9 corresponds to the processing performed when the controller 11 determines, in step S22 of FIG. 4, that the registered connection information does not match the connection information input to the test screen W100 (step S22; No).

When the registered connection information does not match the connection information input to the test screen W100 (the provider input box Bx10 and the account name input box Bx12), the controller 11 displays, as an error display, the contents with the purport that the connection test cannot be continued because the connection information does not match (i.e., a message "Connection test cannot be continued because connection information does not match. Please check connection information.") in the execution result or the like display area R22.

By checking the contents displayed in the execution result or the like display area R22, the user can understand that the connection test cannot be continued because the assumed connection information is not correct.

Figure 10:
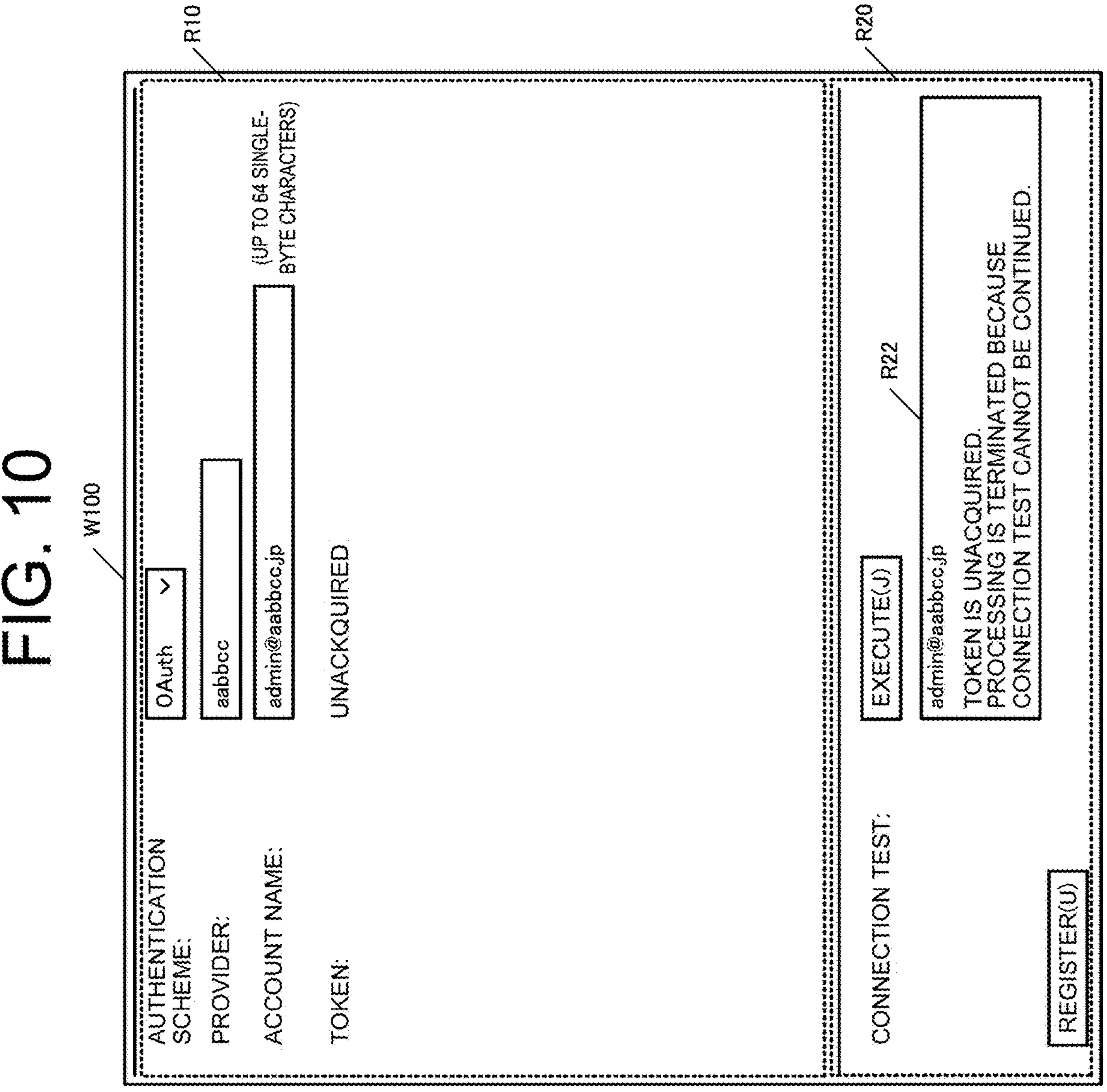
FIG. 10 is a diagram illustrating an operation example according to the first embodiment.

FIG. 10 is a diagram illustrating another example of a display configuration of the test screen W100 when a connection test has failed as in FIG. 9. The operation example described with reference to FIG. 10 corresponds to the processing performed when the controller 11 determines, in step S18 of FIG. 4, that a token as the authentication information involved with the authorization by the OAuth authentication has not been acquired yet (step S18; No).

When a token involved with the authorization by the OAuth authentication has not been acquired yet, the controller 11 displays, as an error display, the contents with the purport that the connection test cannot be continued because a token has not been acquired yet (i.e., a message "Token is unacquired. Processing is terminated because connection test cannot be continued.) in the execution result or the like display area R22.

By checking the contents displayed in the execution result or the like display area R22, the user can understand that the connection test cannot be continued because a token has not been acquired yet.

As described above, when a connection test has failed, the cause related to the failure of the connection test (incomplete item, deficiencies, or the like) is displayed as an error, and by such a display, the user can easily recognize which item should be input (or corrected) specifically.

During input of the connection information via the connection information input area R10 of the test screen W100, the test screen W100 is in a state in which the input has not been completed, and neither is the connection test successful. Therefore, it is also possible to perform display control in such a way that the Execute (J) button and the Register (U) button are grayed out so that the user cannot select these buttons. In this case, it is possible to prevent the user from selecting the Execute (J) button and the Register (U) button at an erroneous timing by making the Execute (J) button active (i.e., in a selectable state) at the time when the input of the necessary connection information is completed, and making the Register (U) button active when the connection test has been successful. Further, also in a case where the connection test has failed, the Execute (J) button and the Register (U) button on the test screen W100 may be displayed to be grayed out so that the selection of these buttons by the user can be restricted.

FIG. 11 illustrates an example of a display configuration of a test screen W110 to be displayed by the controller 11 when an authentication scheme other than the OAuth authentication, such as the SMTP authentication and the POP authentication, is selected as the authentication scheme via the authentication scheme selection pull-down menu P10. In FIG. 11, input of the connection information related to the SMTP authentication will be described, and parts which can be configured to be the same as those of the test screen W100 exemplified in FIG. 6 are denoted by the same reference numerals and description thereof may be omitted.

The test screen W110 includes a connection information input area R14 and the connection test execution area R20.

The connection information input area R14 exemplified in FIG. 11 includes the provider input box Bx10, a user name input box Bx14, a password input box Bx16, and a password change check box T10.

The provider input box Bx10 is an input box to receive an input of provider information for specifying the service provider, which is regarded as the target of the authentication processing. In the provider input box Bx10, information for specifying the cloud 30 on the network NW, such as the name, a domain name, and a URL of the cloud 30 as the service provider, for example, can be input.

The user name input box Bx14 is an input box to receive an input of the user name for the service provider that has been input in the provider input box Bx10. The password input box Bx16 is an input box to receive an input of the password set corresponding to the user name that has been input in the user name input box Bx14. The user name that has been input in the user name input box Bx14 and the password that has been input in the password input box Bx16 are associated with each other and are used as the connection information for the service provider. The password change check box T10 is a check box to receive an instruction to change the password. When the password change check box T10 is checked, the controller 11 receives a change of the password.

In the first embodiment, in a case where an authentication scheme other than the OAuth authentication, such as the SMTP authentication and the POP authentication, is selected as the authentication scheme via the authentication scheme selection pull-down menu P10, the controller 11 executes the connection test on the basis of the connection information that has been input to the connection information input area R14 (corresponding to the processing subsequent to the case of Yes in step S16 of FIG. 4).

When a connection test executed in response to receiving an instruction to select the execution button B10 has been successful, the controller 11 can display that the connection test succeeded (i.e., a message "Connection test succeeded. If the input connection information is to be registered, please select [Register (U) button].") in the execution result or the like display area R22. When the controller 11 receives selection of the registration button B12 by the user, the controller 11 stores the connection information, which has been input via the connection information input area R14, in the connection information management table 2161 as the connection information by which the connection has been successful.

FIG. 12 is a diagram illustrating a correspondence relationship between the state on the test screen W100 at the time of selection of a connection test button (the execution button B10) and the registration state of the authentication scheme, with respect to the execution of the connection test according to the first embodiment.

In the first embodiment, it is determined by the controller 11 that a connection test is executed under the following conditions (1) and (2).

(1) When the connection information input or selected via the test screen W100 relates to an authentication scheme other than the OAuth authentication (i.e., for the case of SMTP, no authentication or SMTP authentication, and for the case of POP3, plain text authentication or POP authentication), in a case where the status related to the OAuth authentication indicates "unauthorized" (that a token is unacquired) even when the registration state of the authentication scheme indicates the OAuth authentication, and in a case where the registration state of the authentication scheme represents the connection information related to the authentication scheme other than the OAuth authentication, the controller 11 executes the connection test by using the connection information received via the test screen W100 (see the description within a dotted frame in the drawing).

(2) Only when the registration state of the authentication scheme indicates the OAuth authentication, a token as the authentication information involved with the authorization has already been acquired, and the connection information that has been input or selected via the test screen W100 represents the connection information related to the OAuth authentication, the controller 11 compares the connection information that has been input or selected via the test screen W100 with the registered connection information. Then, when the connection information that has been input or selected via the test screen W100 is the same as the registered connection information, the controller 11 executes the connection test (see the description within a thick frame in the drawing).

In the cases other than the conditions (1) and (2) described above, it is determined by controller 11 that the connection test is an error. In this case, for example, the controller 11 should preferably be configured to update the screen for the connection information input area on the test screen W100 from the connection information input area R14 (an input area of the connection information related to the SMTP authentication or the like) to the connection information input area R10 (an input area of the connection information related to the OAuth authentication), and prompt for continuation of the connection test.

As described above, according to the first embodiment, such a configuration is adopted that only when the registration state of the authentication scheme indicates the OAuth authentication, a token as the authentication information involved with the authorization has already been acquired, and the connection information that has been input or selected via the test screen represents the connection information related to the OAuth authentication, the connection information that has been input or selected via the test screen is compared with the registered connection information, and when the aforementioned pieces of connection information match with each other, the connection test is determined as being executable. By virtue of this configuration, it is possible to prevent a discrepancy from occurring between the connection information by which the connection test has been successful and the connection information that has been input via the test screen. Further, when the authentication scheme represents an authentication scheme in which preliminary authorization is not required other than the OAuth authentication, a connection test can be executed on the basis of the connection information input via the test screen. Therefore, there is no possibility of the convenience of the connection test corresponding to a conventional authentication scheme being reduced.

2 Second Embodiment

A second embodiment represents an embodiment in which, in the first embodiment, when a connection test is determined as being an error on the basis of the acquisition status (i.e., unacquired, acquisition processing in progress, or invalid) of a token as the authentication information, a user is notified of the error details.

Figure 13:
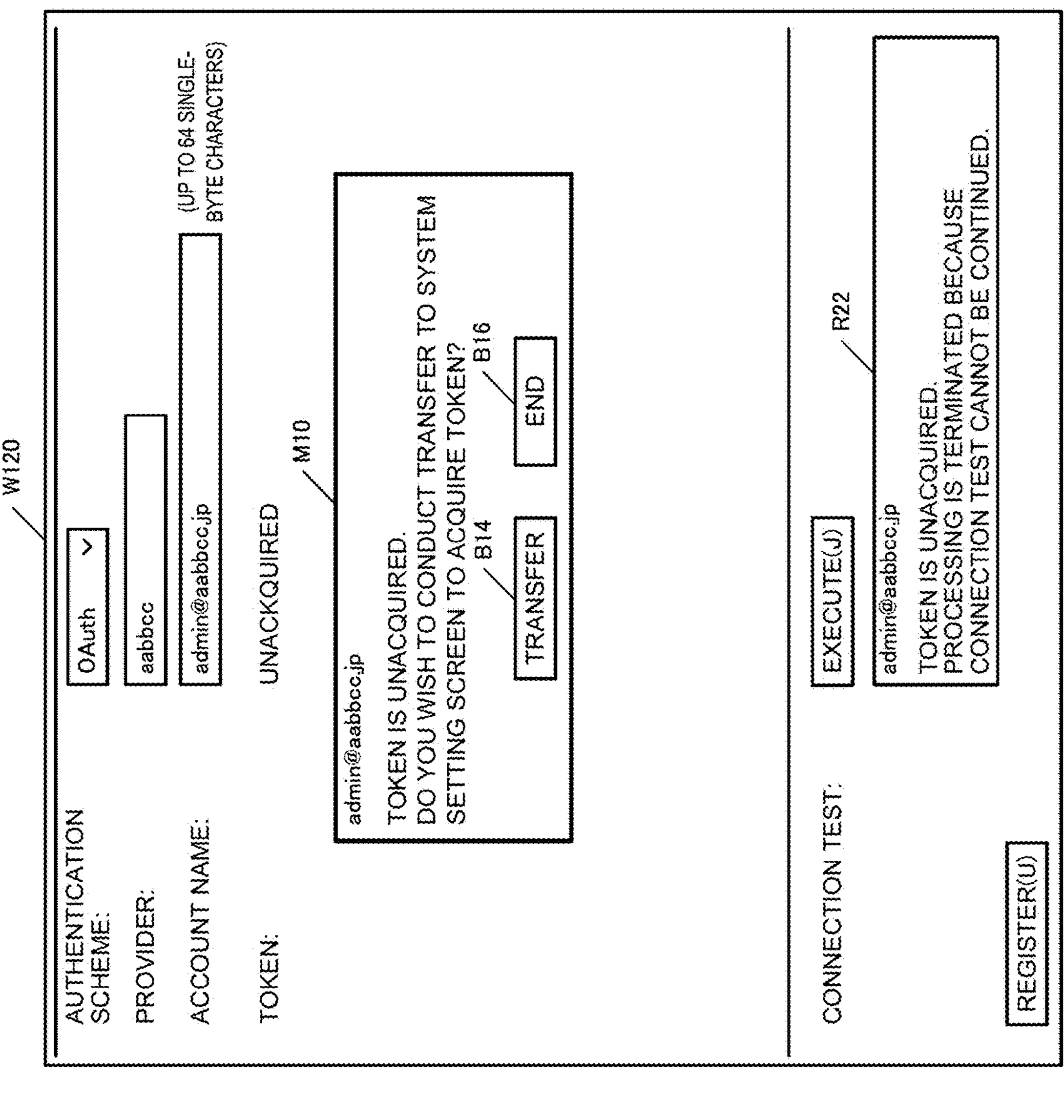
FIG. 13 is a diagram illustrating an operation example according to a second embodiment.
Figure 14:
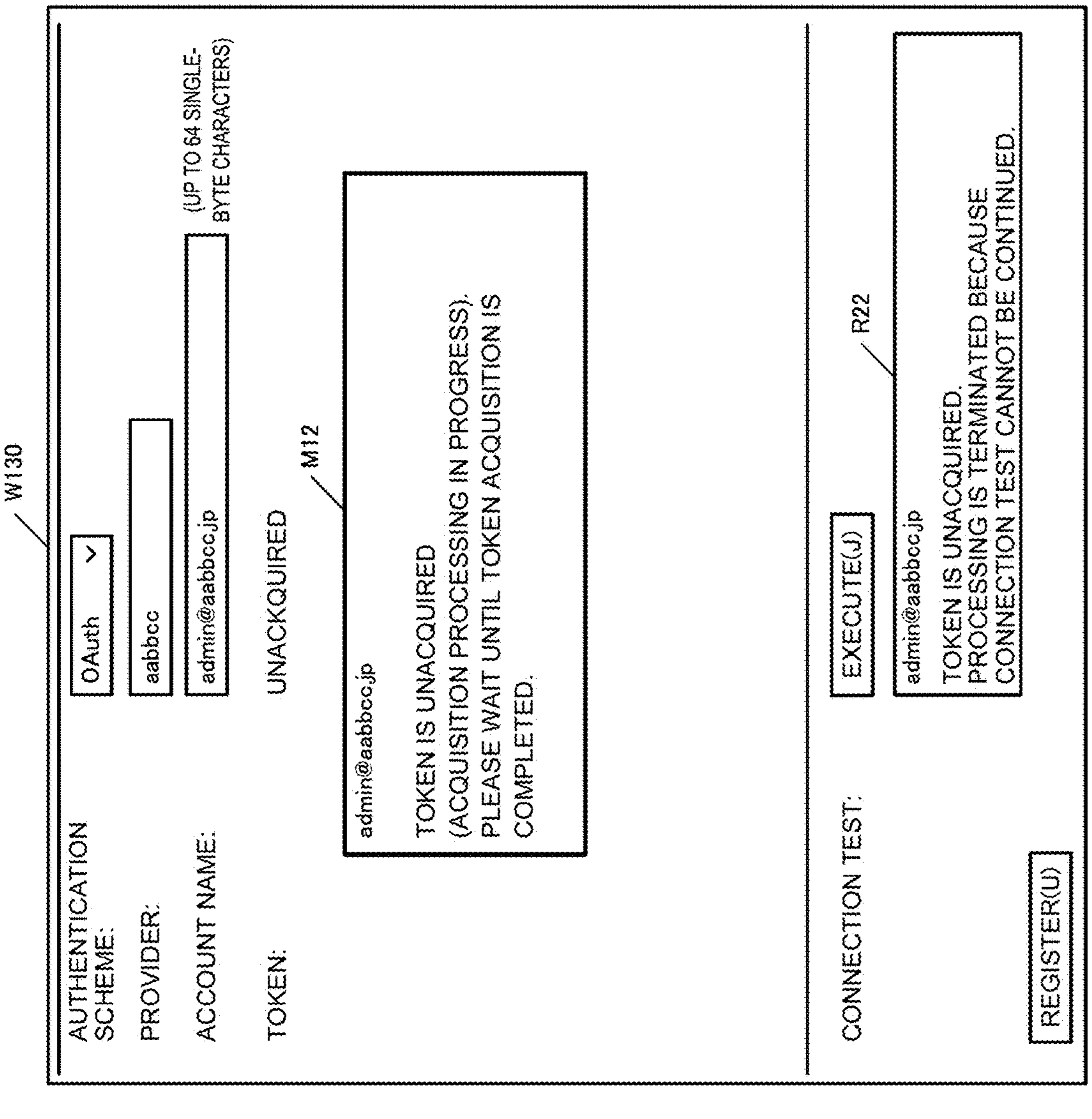
FIG. 14 is a diagram illustrating an operation example according to the second embodiment.
Figure 15:
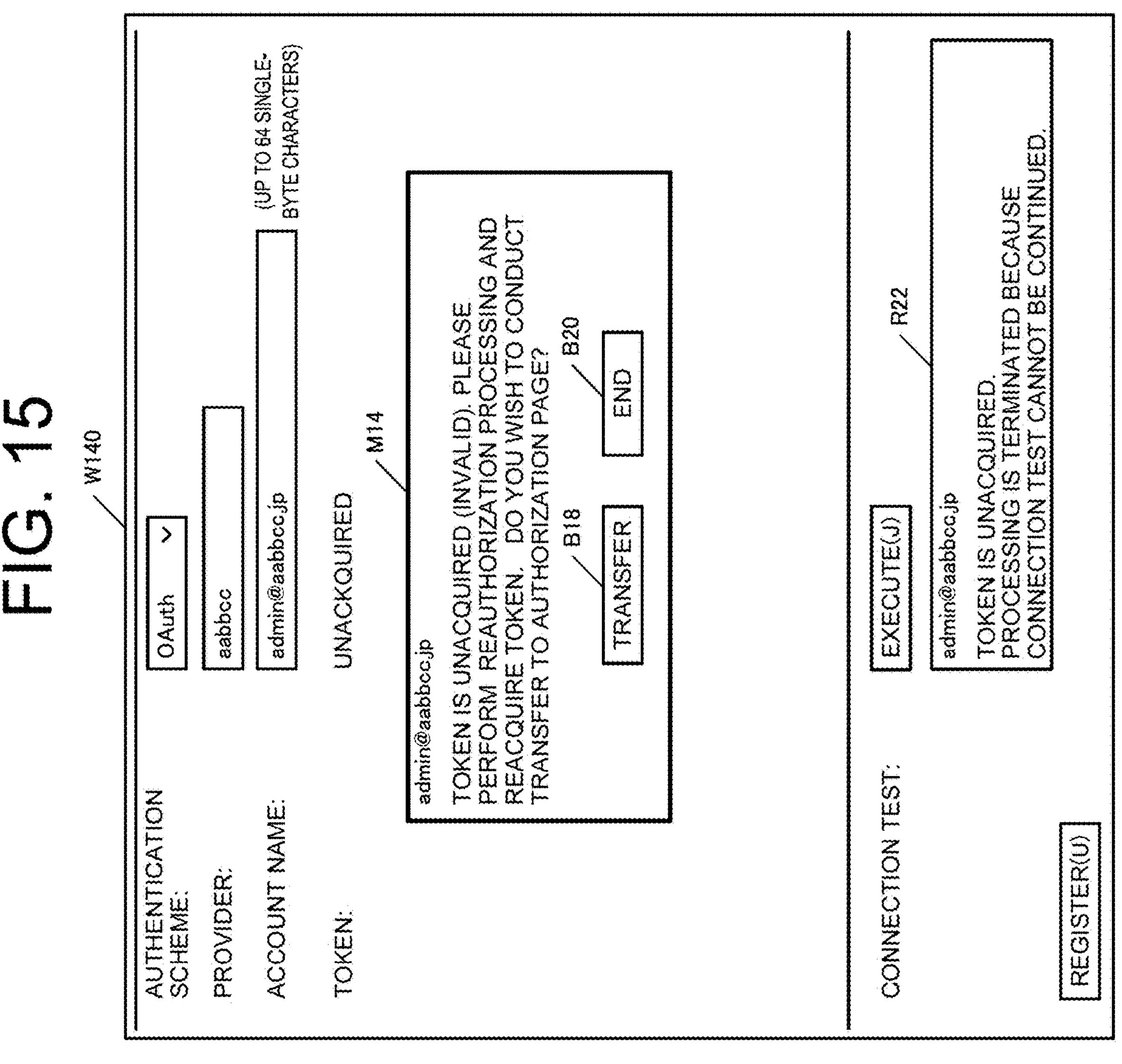
FIG. 15 is a diagram illustrating an operation example according to the second embodiment.

In the second embodiment, for example, the content configuring a message screen exemplified in FIGS. 13 to 15 is stored in a memory 21, and when a controller 11 determines a connection test as being an error, the controller 11 displays the message screen on a test screen according to the token acquisition status (i.e., unacquired, acquisition processing in progress, or invalid). Since configurations other than the above and a flow of the processing are substantially the same as those of the first embodiment, description thereof is omitted.

2.1 Operation Examples

FIG. 13 is a diagram illustrating an example of a display configuration of a message screen M10 displayed by the controller 11 when the connection test is determined as being an error, on the grounds that a token as the authentication information is unacquired. A test screen W120 illustrated in FIG. 13 is an example in which the message screen M10 is superimposed and displayed on the test screen W100 exemplified in FIG. 10.

The message screen M10 shows an example which displays that a token as the authentication information is unacquired, and the contents prompting for a screen transfer to a system setting screen or the like for acquisition of the token. In this case, by providing a Transfer button B14 to receive selection of a screen transfer to the system setting screen (a token acquisition screen) and an End button B16 or the like to receive ending of the processing without performing the screen transfer, it is possible to facilitate the operation such as acquisition of a token by the user. Note that the message screen M10 may be configured such that the screen transfer to the system setting screen (the token acquisition screen) is not performed, but a device (for example, a token acquisition button or the like) for acquiring a token is provided instead, so that the processing related to the token acquisition is completed on the message screen M10.

FIG. 14 is a diagram illustrating an example of a display configuration of a message screen M12 displayed by the controller 11 when the connection test is determined as being an error, on the grounds that acquisition processing for a token as the authentication information is in progress. A test screen W130 illustrated in FIG. 14 is an example in which the message screen M12 is superimposed and displayed on the test screen W100 exemplified in FIG. 10.

The message screen M12 shows an example which displays that a token as the authentication information is unacquired (i.e., acquisition processing in progress), and the contents prompting the user to wait until the token acquisition is completed. Since the message screen M12 displays that the error of the connection test is due to a token not having been acquired (i.e., acquisition processing in progress), the user can easily ascertain the cause of the error of the connection test. Note that the message screen M12 may display a button for receiving selection of a screen transfer to transfer to a screen for confirming the acquisition status of the token.

FIG. 15 is a diagram illustrating an example of a display configuration of a message screen M14 displayed by the controller 11 when the connection test is determined as being an error, on the grounds that a token as the authentication information is invalid (for example, the validity period has expired). The test screen W140 illustrated in FIG. 15 is an example in which the message screen M14 is superimposed and displayed on the test screen W100 illustrated in FIG. 10.

The message screen M14 shows an example which displays that a token as the authentication information is invalid, and the contents prompting for a screen transfer to an authorization screen or the like for reacquisition of the token. In this case, by providing a Transfer button B18 to receive selection of a screen transfer to the authorization screen and an End button B20 or the like to receive ending of the processing without performing the screen transfer, it is possible to facilitate the operation such as the authorization processing and reacquisition of the token by the user. Note that the message screen M14 may be configured such that the screen transfer to the authorization screen (the token acquisition screen) is not performed, but a device (for example, a reacquisition button or the like) for authorization and reacquisition of a token is provided instead, so that the processing related to the token reacquisition is completed on the message screen M14.

When the connection test is determined as being an error on the grounds that the token as the authentication information is invalid (for example, the validity period has expired), an input of the connection information may be restricted.

FIG. 16 is a diagram illustrating an example of a display configuration of a message screen M16 displayed by the controller 11 when the connection test is determined as being an error, on the grounds that a token as the authentication information is invalid (for example, the validity period has expired). A test screen W150 illustrated in FIG. 16 is an example in which the message screen M16 is superimposed and displayed on the test screen W100 exemplified in FIG. 10, and inputs of the connection information to a provider input box Bx10 and an account name input box Bx12 are restricted.

The message screen M16 shows an example which displays that the token as the authentication information is invalid, and that an input to each item (the provider input box Bx10 and the account name input box Bx12) which receive input of the connection information is restricted. In this way, by restricting the input of the connection information when a token is invalid, it is possible to prevent the user from inputting erroneous connection information. Note that the test screen W150 may be provided with a Delete button B14 which receives an instruction to delete the token. As the user selects the Delete button B14, an invalid token can be deleted.

As described above, according to the second embodiment, when the connection test is determined as being an error on the basis of the acquisition status (i.e., unacquired, acquisition processing in progress, or invalid) of the token as the authentication information, the user is notified of the error details. Therefore, the user can easily ascertain why the error occurred. In addition, according to the second embodiment, since a device or a hint for resolving the error can also be provided, the user can resolve the error after ascertaining the error details.

3 Modification Example

With respect to input or selection of the connection information via the test screen, when the registration state of the authentication scheme indicates the OAuth authentication, and a token involved with the authorization has already been acquired, it is also possible to restrict the input or selection of the connection information via the test screen.

For example, FIG. 17 is a diagram illustrating an example of a display configuration of a test screen W160 which restricts input or selection of the connection information via the test screen when the registration state of the authentication scheme indicates the OAuth authentication, and a token involved with the authorization has already been acquired. FIG. 17 shows an example which restricts an input of the connection information by displaying the provider input box Bx10 and the account name input box Bx12 in a dark color in order to explicitly indicate to the user that the input of the connection information via the test screen W160 is disabled. In addition to the above, the input of the connection information may be restricted by graying out the currently set provider and account name. Note that a [Delete (O) button] B22 is a button for receiving an instruction to delete the current connection information. As described above, when the registration state of the authentication scheme indicates the OAuth authentication, and a token involved with the authorization has already been acquired, it is possible to prevent the user from inputting erroneous connection information by restricting the input of the connection information.

The present disclosure is applicable to a token-based authentication scheme such as a Grant Negotiation and Authorization Protocol (GNAP) apart from the OAuth authentication, as the authentication scheme. Further, the present disclosure is not limited to the above-described embodiments, and various modifications can be made. That is, the technical scope of the present disclosure also includes such embodiments that can be obtained by combining technical measures that are modified as appropriate within a range not departing from the gist of the present disclosure.

Furthermore, although some parts of the above embodiments have been described separately for convenience of explanation, it is needless to say that the embodiments may be combined and implemented within a technically possible range.

Further, a program that operates on each apparatus in the embodiments is a program that controls a CPU or the like (a program that causes a computer to function) so as to realize the functions of the above-described embodiments. Further, the information handled in these apparatuses is temporarily accumulated in a temporary storage device (for example, the RAM) during processing and then, stored in various storage devices such as the ROM, HDD, and the like, and is read, corrected, or written by the CPU as necessary.

Here, a recording medium for storing the program may be any one of a semiconductor medium (for example, a ROM, a non-volatile memory card, or the like), an optical recording medium or a magneto-optical recording medium (for example, a digital versatile disc (DVD), a magneto-optical disc (MO), a mini disc (MD), a compact disc (CD), a Blu-ray (registered trademark) disc (BD), or the like), and a magnetic recording medium (for example, a magnetic tape, a flexible disk, or the like). Furthermore, not only are the functions of the embodiments described above implemented by the execution of a loaded program, but the functions of the present disclosure may also be implemented by processing performed in cooperation with an operating system, other application programs, etc., on the basis of an instruction for the program.

Further, when the program is to be distributed to the market, the program may be stored in a portable recording medium for distribution or transferred to a server computer connected via a network such as the Internet. In this case, it is needless to say that a storage device of the server computer is also included in the present disclosure.

Further, each functional block or various features of the apparatus used in the above-described embodiments can be implemented or executed by an electric circuit, such as an integrated circuit or a plurality of integrated circuits. The electrical circuit that is designed to implement the functions described in the present specification may include a general-purpose processor, a digital signal processor (DSP), an application-specific integrated circuit (ASIC), a field programmable gate array (FPGA) or other programmable logic devices, a discrete gate or transistor logic, a discrete hardware component, or any combination thereof. The general-purpose processor may be a microprocessor or may be a conventional processor, a controller, a microcontroller, or a state machine. The above-described electrical circuit may be configured as a digital circuit, or may be configured as an analog circuit. Moreover, when a technology for forming an integrated circuit which could substitute for the current integrated circuits emerges as a result of the progress of the semiconductor technology, one or more aspects of the present disclosure may also use new integrated circuits based on such technology.

What is claimed is:

1. An information processing apparatus comprising:

an inputter which receives an input of connection information; and one or more controllers which control a connection to a service providing apparatus based on the connection information, wherein the one or more controllers determine, when an authentication scheme in the service providing apparatus is an open authorization (OAuth) authentication scheme in which an authorization is preliminarily required, whether or not the connection is practicable according to whether a token, as part of authentication information for the authorization, has been acquired; wherein the one or more controllers execute a connection test when the token has been acquired, and determine that the connection is practicable when the connection test succeeds.

2. The information processing apparatus according to claim 1, further comprising one or more memories which store the connection information, based on which the connection has been successfully established, as first connection information, wherein the one or more controllers determine, when the token has been acquired, whether or not the connection is practicable by comparing the first connection information stored in the one or more memories with the connection information that has been received.

3. The information processing apparatus according to claim 2, wherein the one or more controllers determine that:

the connection is practicable when the first connection information matches the connection information, and the connection is impracticable when the first connection information does not match the connection information.

4. The information processing apparatus according to claim 1, wherein the one or more controllers determine that the connection is impracticable when the token is unacquired.

5. The information processing apparatus according to claim 1, wherein the one or more controllers make a notification when the token is unacquired, that the token is unacquired, is in a process of being acquired, or is invalid.

6. The information processing apparatus according to claim 1, wherein the one or more controllers restrict, when the token is unacquired, receiving of the input of the connection information.

7. The information processing apparatus according to claim 1, wherein the one or more controllers determine, when the authentication scheme is an authentication scheme in which an authorization is not preliminarily required, or when a status of preliminary authorization indicates unauthorized, whether or not the connection is practicable by using the connection information that has been received.

8. A connection determination method comprising:

receiving an input of connection information; and determining, when an authentication scheme in a service providing apparatus is an open authorization (OAuth) authentication scheme in which an authorization is preliminarily required, whether or not a connection to the service providing apparatus based on the connection information is practicable according to whether a token, as part of authentication information for the authorization, has been acquired;

wherein the one or more controllers execute a connection test when the token has been acquired, and determine that the connection is practicable when the connection test succeeds.

* * * * *